Nov. 25, 1930.  J. B. PALMER  1,783,159
REEL
Filed Jan. 14, 1929
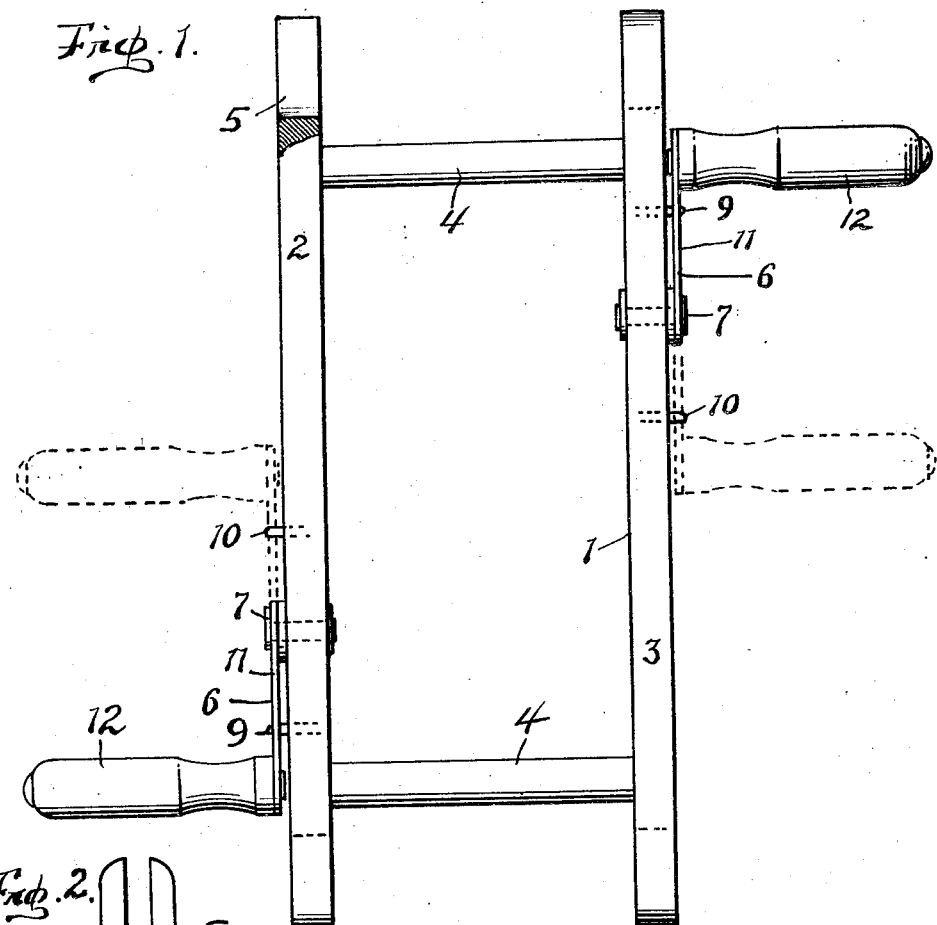
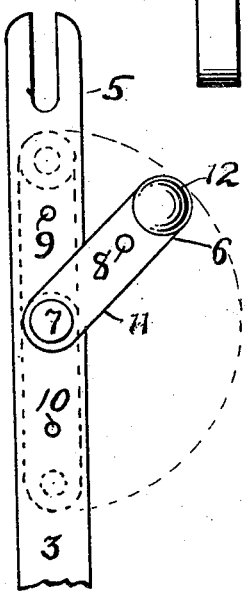
John B. Palmer INVENTOR.
BY
H. G. Burns ATTORNEY.

Patented Nov. 25, 1930

1,783,159

UNITED STATES PATENT OFFICE

JOHN B. PALMER, OF FORT WAYNE, INDIANA, ASSIGNOR OF ONE-HALF TO ALBERT F. PALMER, OF FORT WAYNE, INDIANA

REEL

Application filed January 14, 1929. Serial No. 332,293.

This invention relates to improvements in reels especially for clothes lines and the like, and the object thereof is to provide a reel having a pair of cranks by which the reel frame is manipulated, which cranks are disposed upon opposite sides of the frame and at opposite ends thereof respecting each other, each crank being pivotally connected to the corresponding side of the frame so as to permit adjustment thereof whereby the handle of either crank or both may be positioned in line with the axial center of the frame and serve as pintles for said frame. A further object of the invention is to provide a reel with adjustable cranks so constructed as to admit of ready adjustment thereof from one of its positions to the other.

These objects are accomplished by the construction illustrated in the accompanying drawings, in which:—

Fig. 1 is a front elevation of a structure embodying the invention, partly broken and partly in section; and Fig. 2 is a fragmentary side elevation thereof.

The invention consists of a frame 1 having parallel spaced side bars 2 and 3, which bars are connected together adjacent their ends by transversely disposed rods 4. Each side bar has a longitudinal notch 5 in each end thereof, and has pivoted upon its outer face a crank 6, a pivot 7 for each crank being located suitably distant from the middle or axis of the frame, the pivot for one crank being located upon one side of said axis and the pivot for the other crank being located upon the opposite side thereof. Each crank has made therein an aperture 8, and from the adjacent face of the corresponding side bar project two latch pins 9 and 10 respectively spaced equally upon opposite sides of the pivot 7 of said crank, which pins are adapted to be selectively received in the aperture 8 of said crank accordingly as said crank is adjustably positioned. The arm 11 of each crank is made of spring metal so as to permit its engagement with and disengagement from said latch pins by outward flexure of said arm which is accomplished by manipulating the handle 12 of the crank. The arms 11, however, are sufficiently stiff to sustain said cranks in either of their latched positions under the ordinary strain occasioned in operating the reel.

In utilizing the invention, one end of a clothes line (not shown) is secured in one of the notches 5 in the frame and is wound between the side bars so as to encompass the pair of rods 4, which is accomplished by revolving the frame upon its axis, during which operation the cranks are adjusted in their outermost positions and secured by the pins 9. In unreeling the clothes line, the cranks are adjusted to their intermost positions and secured in line with the axis of the frame by the pins 10 so that the frame may revolve freely while the handles are held stationary by the operator as the line is withdrawn.

The cranks are adjusted from one position to the other and latched by simply springing the handles outwardly and turning the cranks upon their pivots to their opposite positions where they are engaged by the corresponding latch pins.

By adjusting one of the cranks so that its handle is positioned in line with the axis of the frame, and the other crank is adjusted to its outermost position, the frame may be rotated upon its axis while held by the operator with one hand grasping the former handle and applying cranking movement to the handle of the other crank.

What I claim is:—

1. In a reeling appliance, a frame having spaced side bars and transversely disposed connecting members; a crank in pivotal connection with each of said side bars, the pivot of one crank being spaced from the axis of said frame, the pivot for one of said cranks being located at a point opposite that of the other crank respecting said axis, and a pair of latch pins projecting from each of said side bars, oppositely disposed respecting the pivot upon which the crank is mounted, the arm of said crank being adapted to have engagement with said pins selectively according to the adjusted position of the crank.

2. In a reeling appliance, a frame; a crank on each side of the frame having pivotal connection therewith; and a pair of latch pins projecting from each side of the frame disposed respectively on opposite sides of the pivot for the corresponding crank; the arm of said crank having locking relation selectively with said pins accordingly as said crank is adjustably positioned.

3. In a reeling appliance, a frame; and a pair of cranks, one on each side of the frame pivotally connected therewith, one crank disposed adjacent one end of the frame and the other crank adjacent the opposite end thereof, said cranks being arranged to permit adjustment thereof whereby the handles of said cranks, or either of them, may be held in alinement with the axis of the frame.

4. In a reeling appliance, a frame; a member for supporting said frame for rotation upon its axis; a crank upon the one side of the frame, which crank is pivoted to said frame at a point eccentric to the axis thereof; and means for securing said crank in adjusted positions with respect to the frame, whereby the handle of said crank is held in alinement with the axis of the frame or at a point eccentric thereto.

In testimony whereof I affix my signature.

JOHN B. PALMER.